(12) United States Patent
Schmidt et al.

(10) Patent No.: US 7,285,326 B2
(45) Date of Patent: Oct. 23, 2007

(54) LIGHTWEIGHT STRUCTURE PARTICULARLY FOR AN AIRCRAFT

(75) Inventors: Hans-Juergen Schmidt, Buxtehude (DE); Alexei Vichniakov, Bahrendorf (DE)

(73) Assignee: Airbus Deutschland GmbH, Hamburg (DE)

( * ) Notice: Subject to any disclaimer, the term of this patent is extended or adjusted under 35 U.S.C. 154(b) by 233 days.

(21) Appl. No.: 10/888,566

(22) Filed: Jul. 8, 2004

(65) Prior Publication Data

US 2005/0112348 A1 May 26, 2005

(30) Foreign Application Priority Data

Jul. 8, 2003 (DE) ............... 103 30 709

(51) Int. Cl.
*D04H 1/00* (2006.01)
*D04H 5/00* (2006.01)
*D04H 3/00* (2006.01)
*D04H 13/00* (2006.01)

(52) U.S. Cl. ............... 428/292.1; 224/117 R

(58) Field of Classification Search ............ 415/209.3, 415/211.2; 244/17.19, 116, 117 R; 428/292.1, 428/116
See application file for complete search history.

(56) References Cited

U.S. PATENT DOCUMENTS

| | | | |
|---|---|---|---|
| 3,058,704 A | 10/1962 | Bergstedt | |
| 3,401,025 A | 9/1968 | Whitney | |
| 4,052,523 A | 10/1977 | Rhodes et al. | |
| 4,411,380 A | 10/1983 | McWithey et al. | |
| 4,500,589 A | 2/1985 | Schijve et al. | |
| 4,615,733 A | 10/1986 | Kubo et al. | |
| 5,106,668 A | 4/1992 | Turner et al. | |
| 5,151,311 A | 9/1992 | Parente et al. | |
| 5,352,529 A | 10/1994 | Scanlon et al. | |
| 5,429,326 A | 7/1995 | Garesché et al. | |
| 5,498,129 A * | 3/1996 | Dequin et al. ............ 415/209.3 |
| 5,667,866 A | 9/1997 | Reese, Jr. | |
| 5,804,278 A | 9/1998 | Pike | |
| 5,895,699 A | 4/1999 | Corbett et al. | |
| 5,902,756 A | 5/1999 | Aly et al. | |
| 6,114,050 A | 9/2000 | Westre et al. | |
| 6,119,742 A | 9/2000 | Maeng | |
| 2004/0075023 A1 | 4/2004 | Assler et al. | |
| 2005/0112347 A1 | 5/2005 | Schmidt et al. | |

FOREIGN PATENT DOCUMENTS

DE 102 38 460 3/2004

(Continued)

*Primary Examiner*—Rena Dye
(74) *Attorney, Agent, or Firm*—W. F. Fasse; W. G. Fasse

(57) ABSTRACT

An outer skin of an aircraft body is supported by a frame of longitudinal stringers and circumferential ribs or frame elements interconnecting the stringers. Additionally, the outer skin is strengthened by a reinforcing strip formation adhesively bonded to the inwardly facing surface of the outer skin between the ribs and stringers. The reinforcing strips are made of a material that is damage tolerant, for example high strength aluminum alloys and fiber composite materials are suitable for making the reinforcing strip formation. The reinforcing strips of the strip formation may extend in parallel to the stringers and/or the ribs and preferably form a lattice work. The reinforcing strips need not cross each other at right angles but should cross a crack propagation direction in the outer skin.

18 Claims, 3 Drawing Sheets

FOREIGN PATENT DOCUMENTS

| | | |
|---|---|---|
| EP | 0 783 960 | 7/1997 |
| EP | 0 900 647 | 3/1999 |
| EP | 0 573 507 | 1/2000 |
| EP | 1 393 893 | 3/2004 |
| WO | WO92/12856 | 8/1992 |
| WO | WO92/15453 | 9/1992 |
| WO | WO97/25198 | 7/1997 |
| WO | WO98/53989 | 12/1998 |

* cited by examiner

LIGHTWEIGHT STRUCTURE PARTICULARLY FOR AN AIRCRAFT

PRIORITY CLAIM

This application is based on and claims the priority under 35 U.S.C. §119 of German Patent Application 103 30 709.5, filed on Jul. 8, 2003, the entire disclosure of which is incorporated herein by reference.

FIELD OF THE INVENTION

The invention relates to a lightweight structure such as an outer skin secured to a frame structure of an aircraft body.

BACKGROUND INFORMATION

Lightweight structures particularly as used in the aircraft technology and in spacecraft technology, frequently comprise an outer skin, the inwardly facing surface of which is reinforced by a frame structure which herein is referred to as a "two-dimensional" stiffening, compared to the entire body which is "three-dimensional". The aircraft body is constructed of longitudinally extending stringers and circumferentially extending ribs to which the outer skin is secured, whereby the skin is reinforced by the stringers and ribs. In designing such lightweight structures special attention is paid to reducing weight. Further, lightweight structures that are used for different purposes will have different strength requirements and may need to satisfy different fatigue characteristics as well as different tolerances with regard to damages to such structures. Lightweight structures particularly used in aircraft construction must additionally satisfy special regulation requirements with regard to the tolerance characteristics that must be satisfied relative to damages that can occur during use of the aircraft.

Increasing the tolerance against damages or damage tolerance of such lightweight structures can be accomplished in different ways, for example, among other things, by increasing the entire skin thickness, or by providing different skin thicknesses in different locations throughout the lightweight structure so that the skin is thicker in locations exposed to higher loads while the skin is thinner in locations exposed to lesser loads. Strengthening the skin by increasing the thickness of the skin even only locally, increases the weight more than can be tolerated. Another possibility of increasing the skin strength resides in using materials which themselves have improved tolerances against damages. Such materials are disclosed in German Patent Publication DE 102 38 460 A1, which describes metallic laminated materials or fiber composite laminates as are on the market under the Trademark GLARE®.

Fiber reinforced laminated materials have the advantage of a very good tolerance against damages, even though these fiber composite materials have a relatively low density compared to monolithic metallic materials. The term "monolithic" as used herein refers to single layer materials primarily of metals, as opposed to multi-layer laminated materials. Conventional fiber composite materials have, to some extent, static strength characteristics that are not as good as such static strength characteristics of monolithic materials. Due to the lower static strength characteristics of fiber composite materials a weight reduction of the entire lightweight structure is possible only in certain areas which primarily are designed with due regard to the good damage tolerance of these materials. Furthermore, the production of fiber reinforced laminated materials is subject to a substantial effort and expense compared to monolithic sheet metals, due to the needed preparation of thin sheet metal layers for the adhesive bonding with additional prepreg films and due to the necessity of manually positioning and preparing for the following adhesive bonding step. As a result, the production costs for laminated composite materials can be significantly higher than the costs for producing monolithic sheet metals. Noticeably smaller costs are involved in the production of metallic laminated materials without a fiber reinforcement as described in the above mentioned German Patent Publication DE 102 38 460 A1.

OBJECTS OF THE INVENTION

In view of the foregoing it is the aim of the invention to achieve the following objects singly or in combination:
to improve a lightweight structure as described above in such a way that it will have a significantly better tolerance against damages, while keeping any weight increase to an acceptable minimum;
to substantially improve the crack fatigue characteristic of the lightweight structure, more specifically to reduce the crack propagation in such structures; and
to strengthen the outer skin of an aircraft body, particularly in those locations where cracks tend to start and propagate.

SUMMARY OF THE INVENTION

The above objects have been achieved according to the invention by reinforcing strips adhesively bonded to the inwardly facing surface of the outer skin between the structural components of the frame structure or framework, such as stringers and ribs, wherein the reinforcing strips are made of a material that has a good tolerance against damages, for example by preventing or at least retarding crack propagation.

The reinforcing strips may be arranged between the inwardly facing surface of the outer skin and the frame components such as stringers and ribs. Thus, the reinforcing strips may extend longitudinally parallel to the stringers or circumferentially parallel to the ribs, or both. Preferably, the reinforcing strips are arranged as a lattice work. The orientation of the reinforcing strips need not run parallel to the ribs or stringers. Rather, the reinforcing strips may preferably be oriented crosswise to the known direction of crack propagation.

The above described arrangement of reinforcing strips improves the damage tolerance of such lightweight structures as an aircraft body skin in that the propagation, for example, of a fatigue crack is slowed down or even prevented in the area of the outer skin. Thus, the outer skin remains serviceable over a longer period of time, particularly where the reinforcing strips form a lattice structure.

It has been found that the improvement of slowing down crack propagation or preventing crack propagation or crack formation is equally achieved for lightweight structures made of laminated materials as well as of monolithic sheet materials. A significant slow down in the crack propagation has been achieved particularly in arranging the reinforcing strips in the above mentioned lattice work that is positioned between ribs and stringers of the aircraft body frame. More specifically, it has been found that the useful life of the lightweight structure can be increased five-fold because of the slow down of the crack propagation in the outer skin. More specifically, the reinforcing strips in the form of so-called "doublers" between two neighboring stringers or two ribs slow down the crack propagation in the outer skin. It has further been found, based on comparing a single layer monolithic sheet metal skin with a multi-layer metallic laminated material both of which are equipped with reinforcing strips according to the invention and formed as a lattice structure, that the propagation of fatigue cracks is significantly reduced in the laminated material if the fatigue cracks have an initial length corresponding to the spacing between two neighboring stringers. On the other hand, the crack propagation is noticeably higher in the laminated materials than in the monolithic sheet metal skin if the fatigue crack has a length of up to twice the spacing between two stringers.

The advantages of the invention are seen in a weight reduction, particularly in aircraft body skin shells which must have high damage tolerances. These tolerances are particularly significant in the shells forming part of the upper portion of an aircraft body. According to the invention using additional reinforcing strips made of a damage tolerant material, a weight reduction is possible to a significant extent because it is now possible to reduce the thickness of the sheet metal skin by about 20% compared to conventional skin thicknesses of sheet metal skins. Such a 20% reduction in sheet thickness results in a significantly reduced weight of the lightweight structure.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 6:
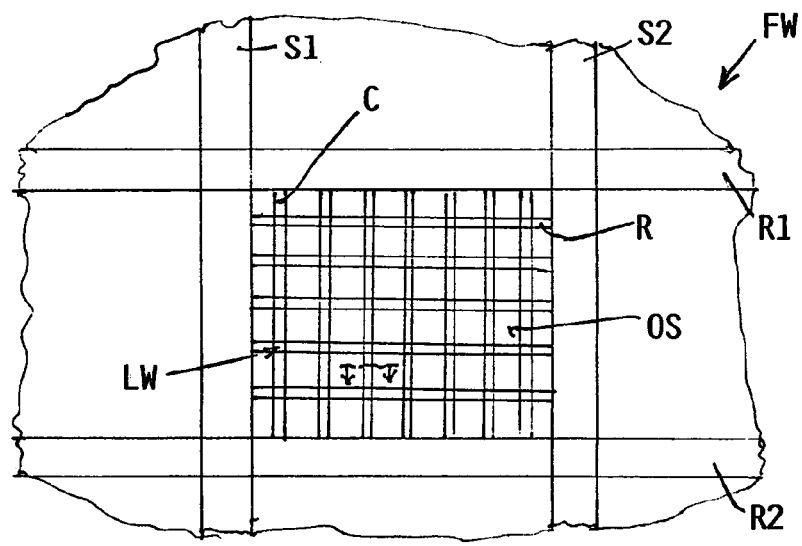
FIG. 6 shows a plan view of a broken away portion of an aircraft body skin illustrating the position of the present lattice work.

Referring first to FIG. 6 for an overview of the invention when it is used in an aircraft body, longitudinally extending stringers S1, S2 form with circumferentially extending ribs an aircraft body frame or framework FW. An outer skin OS covers the framework FW outwardly. In a preferred embodiment according to the invention a lattice work LW is adhesively bonded to the inwardly facing side of the outer skin between the ribs R1, R2 and the stringers S1, S2. As shown the lattice work LW of the preferred embodiment comprises rows R and columns C of reinforcing strips adhesively bonded to the inner surface of the outer skin OS and to each other. While the lattice work of reinforcing strips is preferred, the reinforcing strips may be arranged only as columns or only as rows. In any such embodiments the angular orientation of the columns C and/or rows R relative to the stringers and relative to the ribs will be such that the reinforcing strips cross propagation directions of cracks that may occur in the outer skin, whereby the reinforcing strips retard the propagation of such cracks. Thus, the rows and columns need not extend at right angles relative to each other. Rather, the crossing angles between the reinforcing strips may be different in different embodiments. The lattice work LW is preferably provided in each area between ribs and stringers of an aircraft body not just in one such area as shown in FIG. 6 for simplicity's sake.

The improved retardation of the crack propagation that has been achieved according to the invention is described below with reference to FIG. 5.

Figure 1:
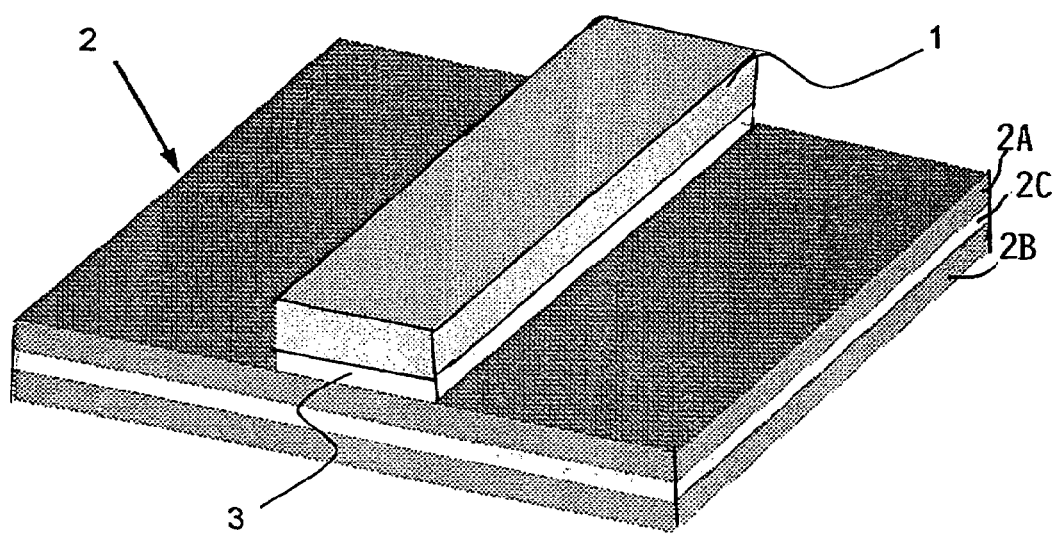
FIG. 1 shows a perspective view of a double layer skin structure strengthened by a reinforcing strip according to the invention.

FIG. 1 shows a reinforcing strip 1 bonded by an adhesive layer 3 to an outer skin 2. The reinforcing strip 1 is preferably secured to the outer skin 2 in the form of a lattice structure as shown in FIG. 6 in which one group of reinforcing strips runs parallel to the longitudinal axis of an aircraft frame, more specifically parallel to the longitudinal stringers S1, S2 of the aircraft framework FW. Another group of reinforcing strips extends in parallel to the ribs R1, R2 of the aircraft frame FW. Thus, the second group of reinforcing trips extends circumferentially around the aircraft body. In the embodiment of FIG. 1 the outer skin 2 is a sandwich structure of two sheet metal layers 2A and 2B bonded to each other by an adhesive 2C. The reinforcing trips 1 are made of a damage tolerant material as will be explained in more detail below. Due to the adhesive bond between the reinforcing strips 1 and the outer skin 2, any crack propagation in the outer skin is retarded or slowed down significantly as will be explained below with reference to FIG. 5. As mentioned, the crossing angle between the reinforcing strips need not be a right angle, but will preferably depend on the known direction of crack propagation, so that reinforcing strips cross the crack propagation direction.

Figure 2:
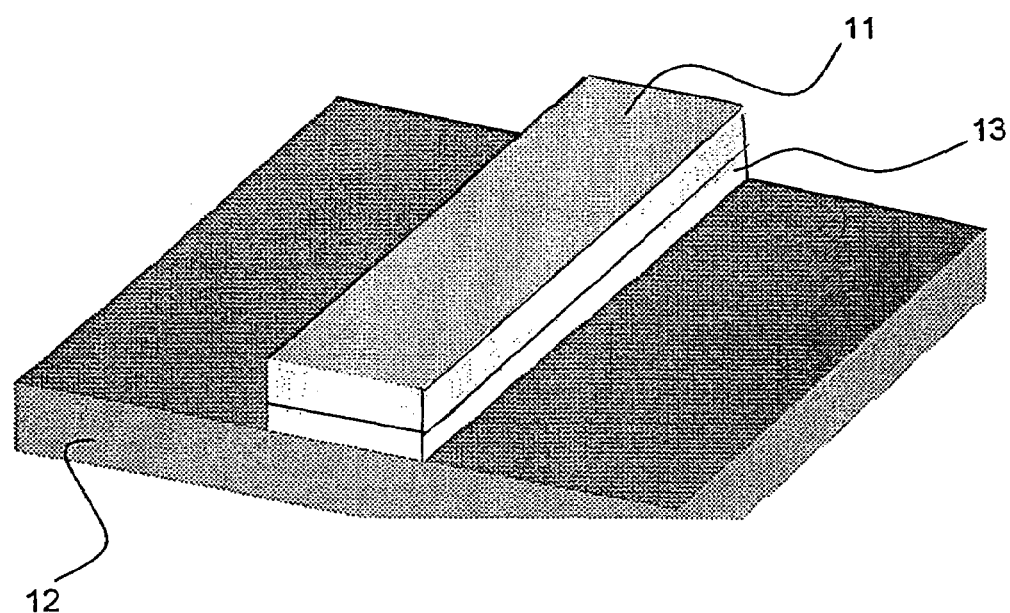
FIG. 2 is a view similar to that of FIG. 1, however, the skin structure is made of a single layer, preferably a monolithic sheet metal layer.

FIG. 2 shows a reinforcing strip 11 bonded to an outer skin 12 by an adhesive layer 13. In this embodiment the outer skin 12 is a monolithic sheet metal member. Again, a plurality of strips 11 are arranged in a lattice structure as described above.

Figure 3:
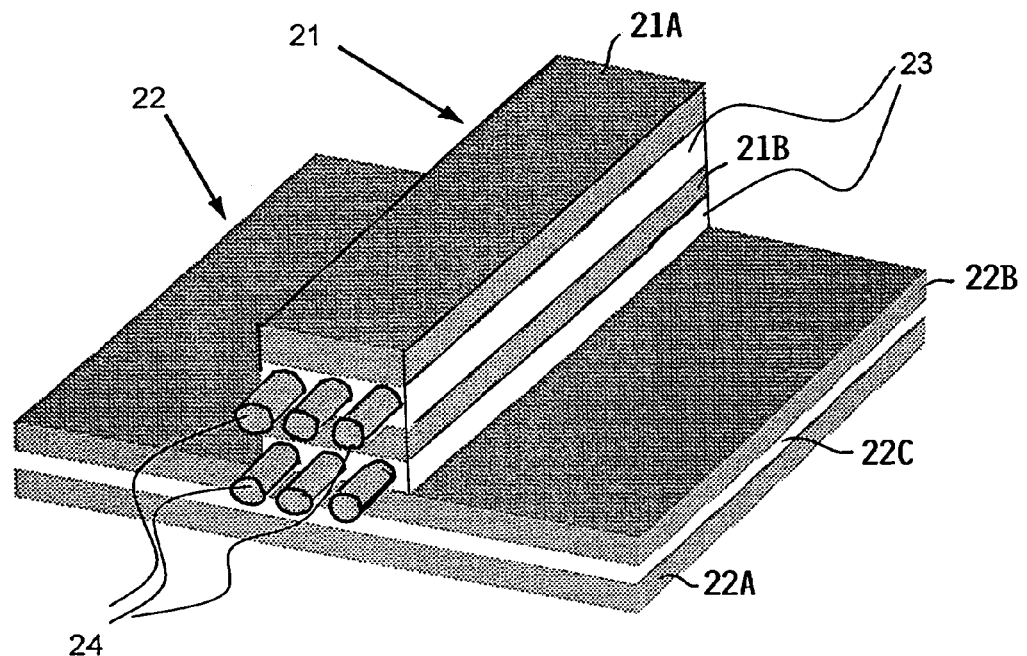
FIG. 3 shows a double layer skin structure strengthened by a multi-layer reinforcing strip.

FIG. 3 shows an embodiment in which the outer skin 22 is a laminated member including, for example a sheet metal member 22A and a fiber composite layer 22B bonded to each other by an adhesive layer 22C. The reinforcing strip 21 in FIG. 3 is a double reinforcing strip comprising, for example, two sheet metal layers or fiber composite layers 21A and 21B with two layers of reinforcing fibers 24 embedded in an adhesive bonding layer 23, for example of epoxy resin.

Figure 4:
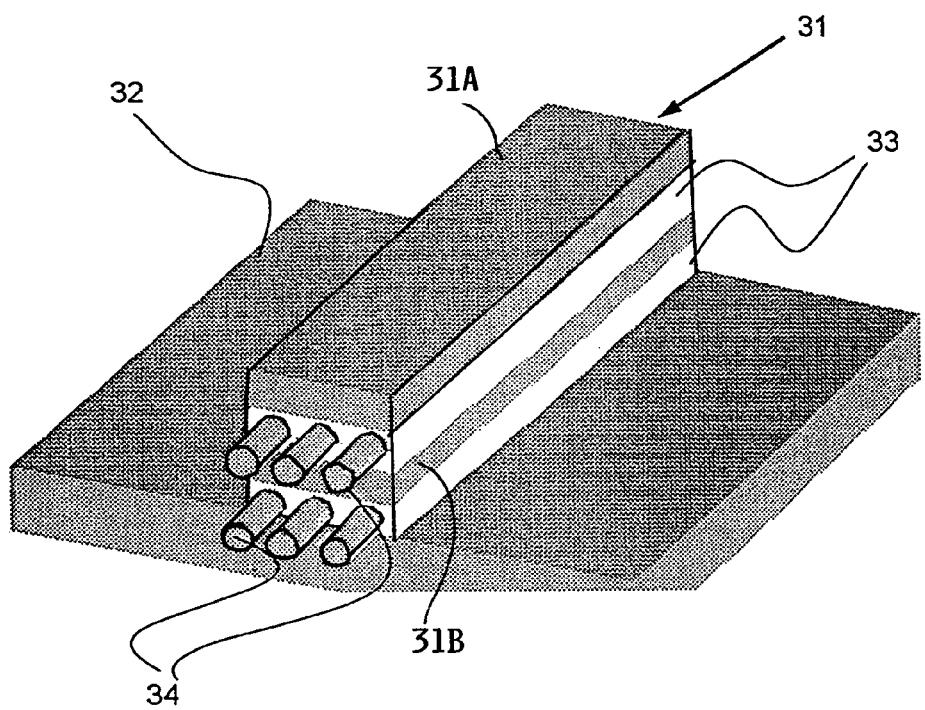
FIG. 4 shows a single layer skin strengthened by a multi-layer reinforcing strip.

FIG. 4 shows an embodiment in which the outer skin 32 is a single layer of a monolithic material such as a sheet metal layer or a fiber composite layer which is strengthened by a reinforcing strip 31 constructed in the same way as in FIG. 3, however the layers 31A and 31B may be fiber composite layers instead of sheet metal layers and these layers are bonded to each other and to the outer skin by adhesive layers 33, for example of epoxy resin in which the reinforcing fibers 34 are embedded.

In each of FIGS. 1, 2, 3 and 4 the reinforcing strips 1, 11, 21 and 31 perform the function of increasing the damage tolerance characteristics of the entire skin structure, whereby the crack propagation in the outer skin is at least retarded or slowed down.

In all embodiments shown in FIGS. 1 to 4, the reinforcing strips 1, 11, 21 and 31 preferably form a lattice work LW as shown in FIG. 1, whereby the individual strips have a width that varies between about 10 mm to about 80 mm. The strips 1 and 11 shown in FIGS. 1 and 2 are preferably made of a monolithic material, particularly an aluminum lithium alloy containing preferably about 3% by weight of lithium. Other high strength aluminum alloys are also suitable for the present purposes. Where the reinforcing strips are made of a fiber composite material, the reinforcing fibers are embedded in a matrix of an aluminum alloy or a magnesium alloy or a titanium alloy. The fibers in this embodiment are, for example, carbon fibers, polyaromatic amide fibers, aluminum oxide fibers, silicon carbide fibers, or basalt fibers. Each of these fibers reinforces the reinforcing strip structure.

As shown in FIGS. 3 and 4, the strips 21 and 31 are also preferably arranged in a lattice structure but have a laminated layer structure, wherein the individual layers 31A and 31B are made sheet metal of aluminum alloys or magnesium alloys or titanium alloys with the fibers 24, 34 embedded in an epoxy resin, whereby the fibers 24, 34 may be selected from glass fibers, carbon fibers, polyaromatic amide fibers, aluminum oxide fibers, silicon carbon fibers or basalt fibers. These fibers 24 and 34 have a length of about 5 mm and have a plastic fatigue limits of at least 500 MPa.

The outer skin 2, 12, 22 and 32 may be made of monolithic sheet metal layers of aluminum alloys, or titanium alloys, magnesium alloys or these outer skins may be laminated materials of two or more plies that are adhesively bonded to each other and if necessary may be individually reinforced by intermediate layers of sheet metal. Any lightweight structure may be constructed of several different layer and several lattice works LW for reinforcement.

Figure 5:
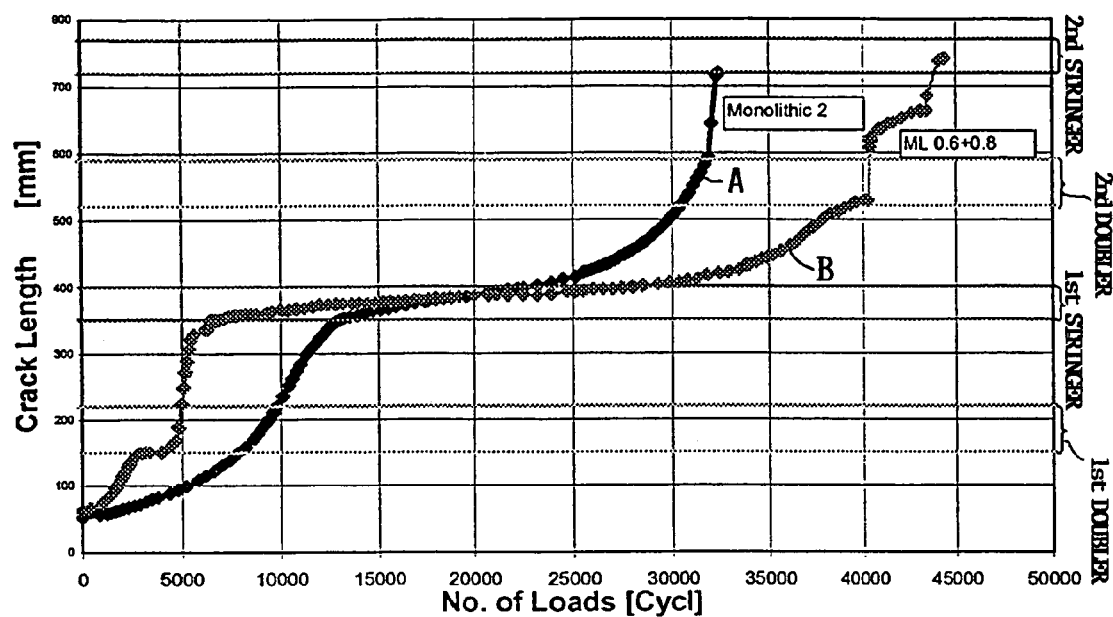
FIG. 5 shows the crack propagation as a function of the number of load cycles applied in a test for two different types of outer skin.

FIG. 5 shows two curves A and B. These curves represent the crack length in mm as a function of load cycles applied for testing a test sample. The sample represented by curve A had a monolithic single layer outer skin as shown, for example in FIGS. 2 and 4. The test sample represented by curve B had a laminated outer skin, for example two metal layers, one being 0.6 mm thick and the other being 0.8 mm thick. Curve A shows that at a crack length of about 400 mm the crack propagation starts rapidly to rise when the load cycles exceed 25,000, On the other hand, curve B shows that the crack propagation is retarded more effectively until about 500 mm crack length and load cycles exceeding about 37,000.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A lightweight structure comprising an outer skin and a frame including frame elements forming a frame structure to which said outer skin is secured, said frame elements including stringers and ribs interconnected with one another thereby forming open fields between said stringers and ribs, wherein said outer skin covers said frame structure and said open fields, said outer skin having skin areas facing radially inwardly into said frame structure through said open fields, said lightweight structure further comprising a lightweight reinforcing strip formation made of a damage tolerating material adhesively bonded to said skin areas facing radially inwardly through said open fields of said frame structure so that said reinforcing strip formation also faces radially inwardly through said open fields for reducing skin crack propagation.

2. The lightweight structure of claim 1, wherein said lightweight reinforcing strip formation is constructed as a lattice work.

3. The lightweight structure of claim 1, wherein said lightweight reinforcing strip formation is made of a composite material.

4. The lightweight structure of claim 1, wherein said lightweight reinforcing strip formation is made of a fiber reinforced alloy matrix, said alloy matrix comprising any one of aluminum, magnesium and titanium alloys.

5. The lightweight structure of claim 4, wherein fibers in said fiber reinforced alloy matrix are any one of carbon fibers, polyaromatic amide fibers, aluminum oxide fibers, silicon carbide fibers and basalt fibers.

6. The lightweight structure of claim 4, wherein said fiber reinforced alloy matrix is an aluminum lithium alloy.

7. The lightweight structure of claim 6, wherein said aluminum lithium alloy comprises 1% to 3% by weight of lithium.

8. The lightweight structure of claim 1, wherein said lightweight reinforcing strip formation is made of a laminated material comprising at least one sheet metal layer and at least one fiber composite layer.

9. The lightweight structure of claim 8, wherein said at least one sheet metal layer comprises any one sheet metal of any one of aluminum, magnesium and titanium, and wherein said at least one fiber composite layer comprises a synthetic material matrix reinforced by fibers of any one of carbon fibers, polyaromatic amide fibers, aluminum oxide fibers, silicon carbide fibers and basalt fibers.

10. The lightweight structure of claim 1, wherein said lightweight reinforcing strip formation is made of a fiber reinforced composite material comprising fibers having a length of at least 5 mm.

11. The lightweight structure of claim 10, wherein said fibers have a yielding point of at least 500 megapascal. (MPa).

12. The lightweight structure of claim 10, wherein said fiber reinforced composite material comprises a matrix of epoxy resin.

13. The lightweight structure of claim 1, wherein said lightweight reinforcing strip formation is made of a monolithic aluminum lithium alloy.

14. The lightweight structure of claim 13, wherein said monolithic aluminum lithium alloy comprises 1% to 3% by weight of lithium.

15. The lightweight structure of claim 14, wherein said outer skin is made of a monolithic sheet metal.

16. The lightweight structure of claim 15, wherein said monolithic sheet metal is any one of an aluminum alloy, a magnesium alloy and a titanium alloy.

17. The lightweight structure of claim 1, wherein said outer skin is made of a laminated material.

18. The lightweight structure of claim 17, wherein said laminated material of said outer skin has a thickness within the range of 0.5 mm to 2.0 mm.

* * * * *